UNITED STATES PATENT OFFICE.

SAMUEL PEACOCK, OF CHICAGO, ILLINOIS, ASSIGNOR TO INTERNATIONAL AGRICULTURAL CORPORATION, OF NEW YORK, N. Y., A CORPORATION OF NEW YORK.

PROCESS OF DECOMPOSING NATURAL SILICATES CONTAINING POTASSIUM AND ALUMINUM.

1,129,224.      Specification of Letters Patent.     Patented Feb. 23, 1915.

No Drawing.     Application filed July 8, 1912. Serial No. 708,274.

*To all whom it may concern:*

Be it known that I, SAMUEL PEACOCK, a citizen of the United States, residing at Chicago, in the county of Cook and State of Illinois, have invented certain new and useful Improvements in Processes of Decomposing Natural Silicates Containing Potassium and Aluminum; and I do hereby declare the following to be a full, clear, and exact description of the invention, such as will enable others skilled in the art to which it appertains to make and use the same.

This invention relates to a process of decomposing natural silicates, and recovering a large proportion of their contained potassium and aluminum in combination while at the same time forming compounds containing fixed nitrogen having a high fertilizer value.

The object of the invention is to attain the above results in a simple, expeditious and comparatively inexpensive manner; and to these ends the invention consists in the novel steps constituting my process as will be more fully hereinafter disclosed and particularly pointed out in the claims.

In carrying out my process, I finely divide a natural silicate rock carrying potassium and aluminum, such as feldspar, leucite, etc., and mix the same with finely divided carbon in suitable proportions when the mixture is heated by any suitable means in an atmosphere of nitrogen to a temperature of, say, between 1600° C. and 2000° C., when it will be found that the reaction, which really begins at about 1400° C., spreads until substantially all the potassium and aluminum is displaced or changed into corbo-nitrids. Using ortho-close feldspar as an illustration, the reaction proceeds as follows:—

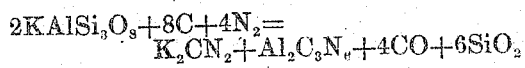

In order to produce ammonia from the carbo-nitrids obtained by my process, it is only necessary to subject the said carbo-nitrids to the action of superheated steam in an auto-clave at a pressure exceeding four or five atmospheres, when ammonia will be produced in accordance with the following equations:—

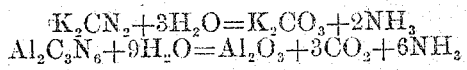

The temperatures mentioned may be lowered by maintaining the partial pressures of the reaction products below the normal. This I prefer to accomplish by carrying out the process in an air tight furnace and sweeping out the gases by the admission of fresh volumes of nitrogen and the withdrawal of the gaseous reaction products.

The advantages of this process, it will be seen, reside in the ability to separate potassium and aluminum from silicate rocks in forms suitable for conversion into valuable industrial compounds such as potassium carbonate, aluminum oxid, and ammonia. It will be further observed that all the steps, even those for the fixation of atmospheric nitrogen are expeditious, simple and less expensive than those heretofore proposed for this purpose.

What I claim is:—

1. The process of decomposing natural silicate rocks containing potassium and aluminum and recovering compounds of said metals which consists in heating a mixture of said silicate rock and carbon in an atmosphere substantially devoid of free oxygen in the presence of nitrogen to a temperature above 1600° C.; and suitably recovering the metallic carbo-nitrids thus formed, substantially as described.

2. The process of decomposing natural silicates containing potassium and aluminum and recovering compounds of said metals which consists in heating a mixture of said silicates and carbon in an atmosphere of nitrogen to a temperature sufficient to bring about the reaction; sweeping nitrogen above the mixture to lower the partial pressures of the reaction products; suitably recovering the metallic carbo-nitrids thus formed, substantially as described.

3. The process of forming potassium and aluminum carbo-nitrids from a natural silicate rock which consists in heating a mixture of said rock and carbon in the presence of free nitrogen to a temperature above 1600° C., thereby forming said carbo-nitrids, substantially as described.

In testimony whereof, I affix my signature, in presence of two witnesses.

SAMUEL PEACOCK.

Witnesses:
D. S. TOVELL,
R. S. CHILTON.